W. S. HADAWAY, Jr.
HEATING APPARATUS.
APPLICATION FILED MAR. 4, 1916. RENEWED NOV. 15, 1919.

1,349,130. Patented Aug. 10, 1920.
3 SHEETS—SHEET 1.

W. S. HADAWAY, Jr.
HEATING APPARATUS.
APPLICATION FILED MAR. 4, 1916. RENEWED NOV. 15, 1919.

1,349,130.

Patented Aug. 10, 1920.
3 SHEETS—SHEET 2.

Inventor
William S. Hadaway Jr.
By his Attorney

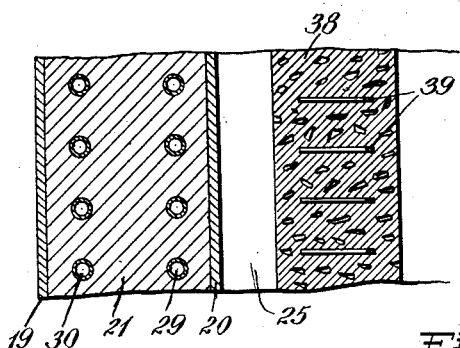
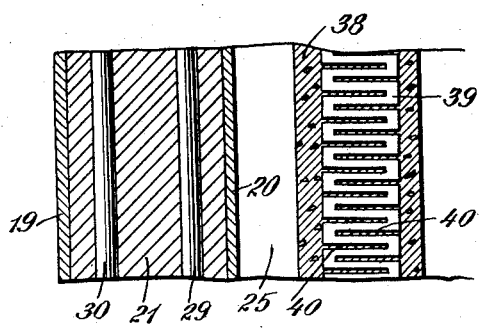
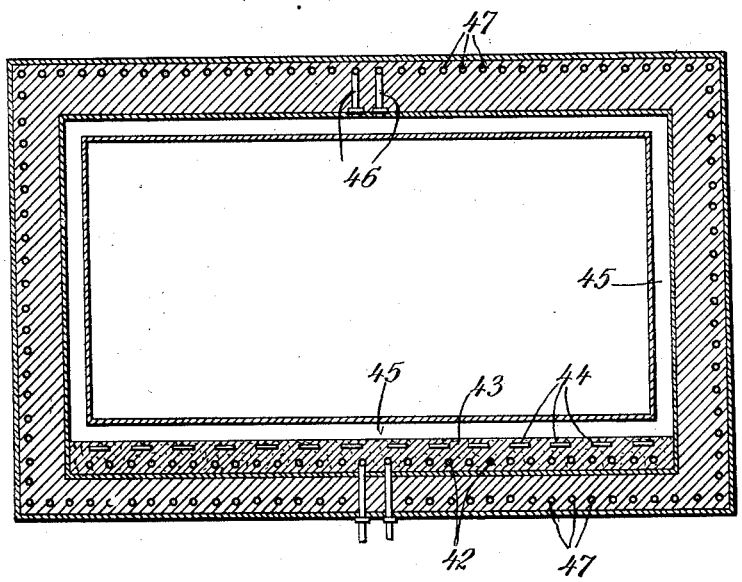
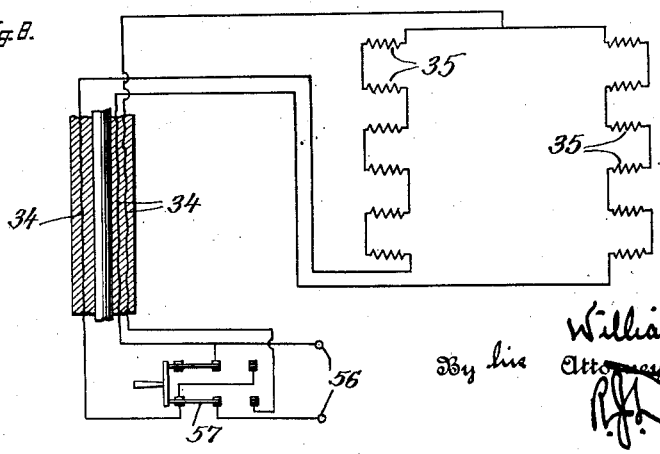

UNITED STATES PATENT OFFICE.

WILLIAM S. HADAWAY, JR., OF NEW ROCHELLE, NEW YORK.

HEATING APPARATUS.

1,349,130.

Specification of Letters Patent.

Patented Aug. 10, 1920.

Application filed March 4, 1916, Serial No. 82,067. Renewed November 15, 1919. Serial No. 338,328.

*To all whom it may concern:*

Be it known that I, WILLIAM S. HADAWAY, Jr., a citizen of the United States, and a resident of New Rochelle, Westchester county, and State of New York, have invented certain new and useful Improvements in Heating Apparatus, of which the following is a specification, reference being had to the accompanying drawings, forming a part thereof.

My invention relates to heating apparatus and has special reference to devices which require large quantities of relatively high temperature heat, such as, for example, japanning ovens or ovens for cooking and baking.

In my copending application Serial No. 42,934, filed July 31, 1915, I have shown heating apparatus which is adapted to utilize low pressure steam for example, to provide a relatively large quantity of low temperature heat and electricity to supplement the low pressure steam, and to provide a relatively small quantity of high temperature heat. The electric energy is utilized to superheat the steam and the temperature of the heat produced by the steam constitutes a working level from which the electric energy operates.

There are many devices in commercial use which require instead of a large quantity of low temperature heat and a smaller quantity of high temperature heat, a relatively large quantity of high temperature heat. For example, ordinary ovens for cooking and baking require a temperature of about 400 degrees upward with relatively small fluctuations, or adjustments, depending on the nature of the work to be performed. Japanning ovens such as are largely used in commercial manufacturing processes constitute a very good example of apparatus which consumes high temperature heat in large quantities with a relatively small temperature variation required, say, from 450 to 550 degrees.

If steam or some other relatively inexpensive source of heat is employed for purposes of this kind, as a means for providing a working level, there is still a very large quantity of heat energy to be supplied provided the working level is about 220 degrees, corresponding to the temperature of low pressure steam.

According to my present invention, I utilize a combustion superheater as a means for elevating the working level to approximately the minimum temperature required of the apparatus, say, for example, 400 or 450 degrees, and utilize electric energy at the apparatus for regulating and boosting the temperature of the steam which has already been superheated.

One object of my invention is to provide a heating apparatus utilizing a relatively inexpensive source of heat for providing a very large proportion of the heat required for high temperature apparatus.

Another object of my invention is to provide a relatively high temperature heating apparatus adapted to receive a large proportion of the high temperature heat required from an inexpensive source, and to utilize a small proportion of electric energy for boosting and regulating the temperature of the heat otherwise provided.

Another object is to provide a simple and improved oven adapted to receive superheated steam and comprising electric heating devices for boosting and regulating the temperature of the oven.

Another object is to provide an electric heater adapted to raise the temperature of steam which steam may, for example, be already superheated.

Another object is to provide a structure having a large heat capacity, that shall be adapted to electrically generate heat, to transmit steam and to superheat or boost the temperature of the steam as it is transmitted.

Another object is to provide a heating system embodying a steam generator, a superheater associated therewith, means for regulating the flow of steam through the superheater, heating apparatus adapted to receive the superheated steam from the generator, and electro-responsive means for boosting the temperature of the superheated steam at the heating apparatus.

Other objects of my invention will be set forth hereinafter, and in order that my invention may be thoroughly understood, I will now proceed to describe the same in the following specification, and then point out the novel features thereof in appended claims.

Referring to the drawings.

Figure 3:
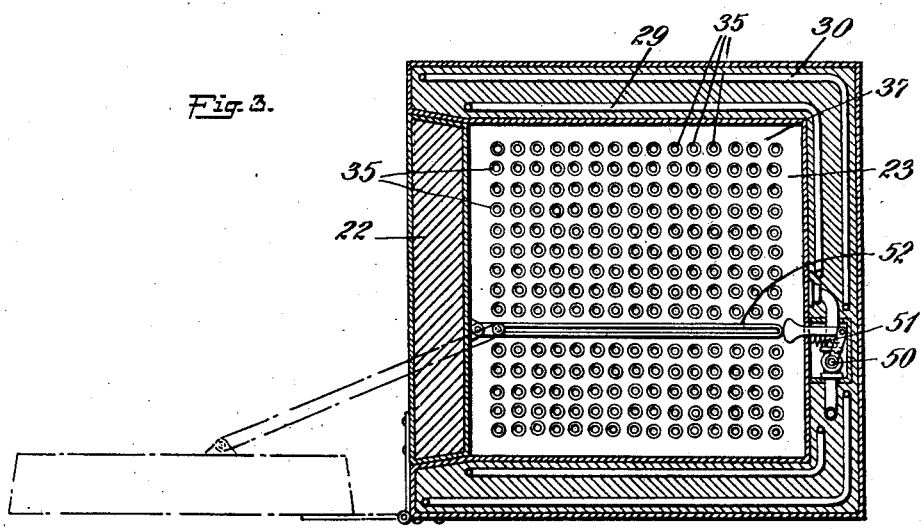

A transverse sectional elevation is shown in Fig. 3.

A sectional detail of one of the electric heaters for boosting the temperature of the steam is shown on a larger scale in Fig. 4.

Figs. 5 and 6 are partial sectional views at right angles to each other showing details of a modified oven and heaters therefor which also embody my invention.

Figure 1:
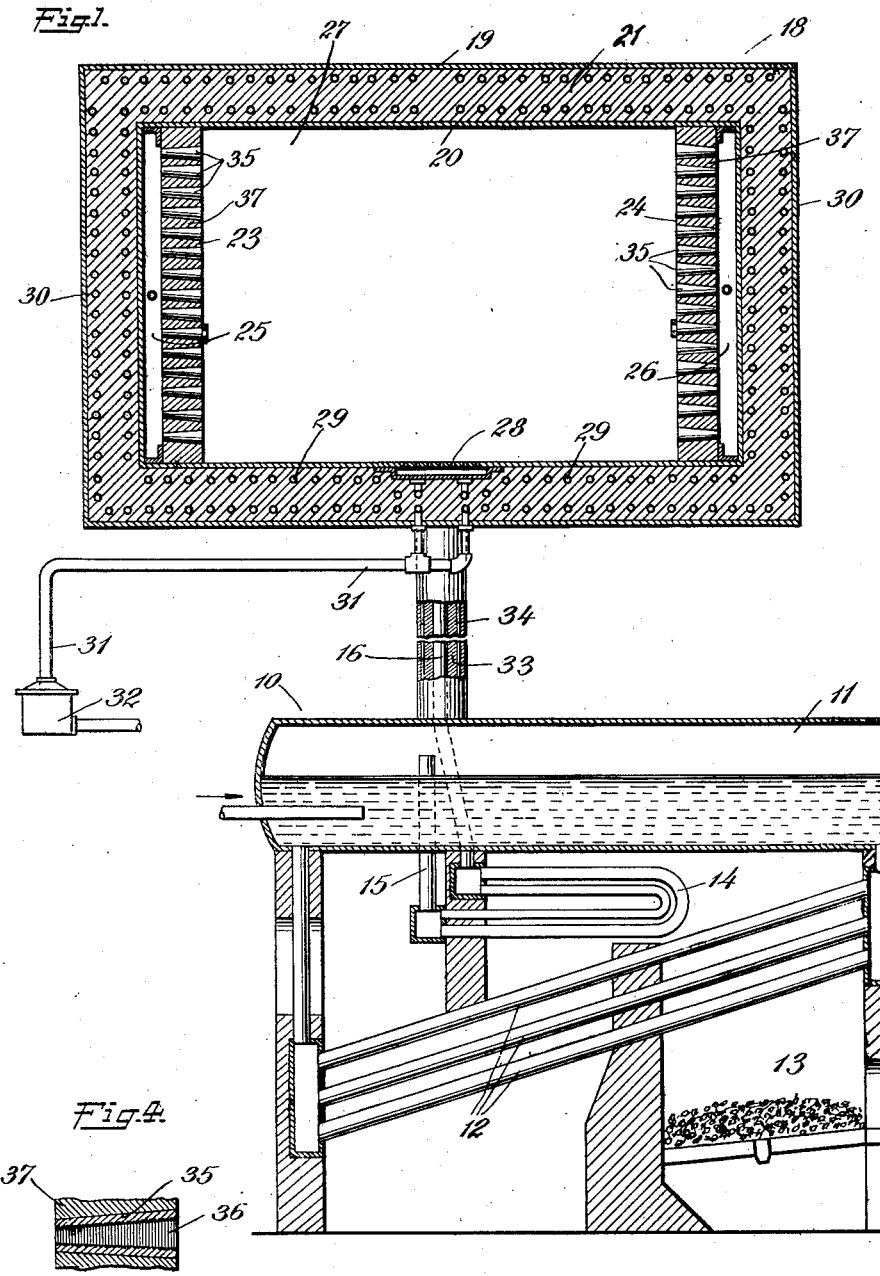
Figure 1 is a partially diagrammatic view of a heating plant or system showing in sectional elevation a steam generator and superheater, and an oven which receives its energy partly from the superheated steam and partly from an electric circuit.

Fig. 7 is a view corresponding to that of the oven in Fig. 1, of another modification of my invention.

A diagram illustrating the circuit connections for one arrangement of the oven heaters, is shown in Fig. 8.

Having special reference to Figs. 1 to 4 inclusive, 10 designates a steam generator of which 11 is the steam drum, 12 water tubes, 13 the firepot and 14 the superheater coil. The steam generated in the steam drum 11 flows through pipe 15 into the superheater coil 14, and is discharged through a pipe 16 which is connected to an oven 18.

The oven comprises an outer shell 19 and an inner shell 20 with heat insulation 21 between them, a door 22 and a pair of electric heaters 23—24 which provide the steam chambers 25—26 and are adapted to boost the temperature of the steam as it flows from the steam chambers through the heater structure, as hereinafter explained, and into the oven chamber 27.

Figure 2:
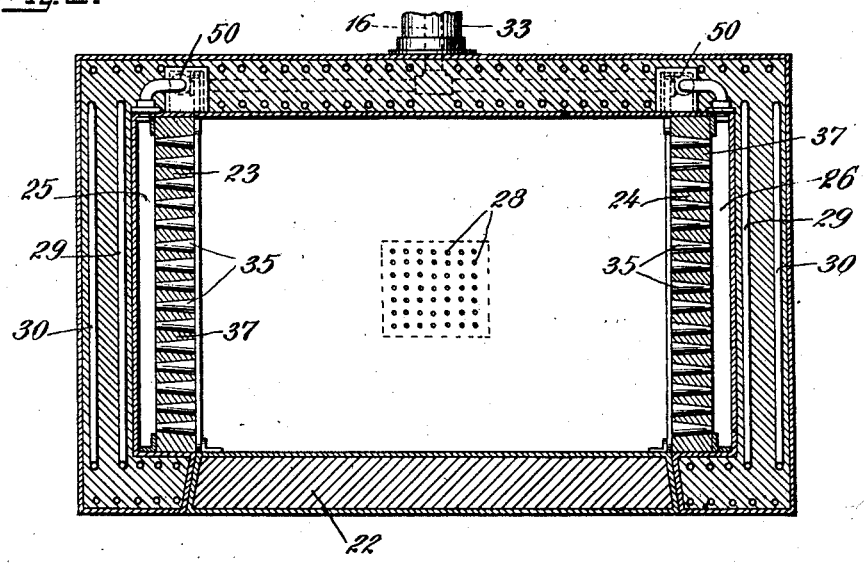
Fig. 2 is a sectional plan view of the oven which forms a part of the system of Fig. 1.

The supply pipe 16 is connected as clearly shown in Fig. 2, to the steam chambers 25—26, and the oven chamber is provided with an outlet 28 from which the steam is discharged into pipe coils 29 and 30. The coils 29 are disposed in the insulation 21 close to the inner shell 20 of the oven, while the coils 30 are disposed in the insulation close to the outer shell 19 of the oven. The steam after flowing through the coils 29 enters the coils 30 and is finally discharged through outlet pipe 31 to a steam trap which is indicated 32.

As shown in Fig. 1, the pipe 16 which conducts the superheated steam from the generator to the oven is thoroughly protected by insulation 33. Preferably disposed in this insulation are electric conducting wires 34 which may be of sufficiently high resistance to generate heat in the insulation and prevent a drop in temperature from the steam generator to the oven. The conductor for the superheated steam including the electrially heated insulation, may be suitably formed in accordance with my copending application Serial No. 67,147, Series of 1915, entitled The generation and distribution of heat.

The electric heaters 23—24 may of course, be formed in any suitable manner, but those shown and described possess many advantages for this service. The structure of Fig. 1 comprises a plurality of resistor tubes 35 within which are wound a resistance wire or ribbon 36, the ribbon or wire being held in place by enamel in a well known manner, or by some other suitable means. The tube itself is formed of insulating material and a large number of them are employed. They are set into a slab 37 of some suitable substance like fire-clay, so that the heater when completed, has a large heat capacity, and provides a plurality of tapering steam passages in which high temperature electric heat is available for raising the temperature of the steam as it passes.

The application of heat to a tubular heat conductor materially increases the resistance to flow and this increase is largely offset by making the ends larger than their intake ends.

The temperature of the steam discharged into the oven is very high and for many classes of work will do no damage, but in case it is not desired to have the steam come in contact with the articles or substance being heated, or cooked, an inner shell or box to receive such articles or substance is provided, the inner box or shell being sealed against the influx of steam. This arrangement is shown with a modified type of electric heater in Fig. 7 and is hereinafter described in detail.

In order to prevent a loss of steam and especially to avoid accident due to the outward rushing of steam when the door 22 is opened, I prefer to utilize valves 50 having springs 51 tending to hold them closed and knobs or strikers which are arranged to be actuated by the suspension links 52 of the door. These links extend close to the oven walls and are pivotally attached to the door near its opposite edges. When the door is closed their inner ends engage the knobs or strikers so as to automatically open the valves in opposition to the springs.

The heater units 35 may be connected in series relation as shown in Fig. 8 or in some other suitable arrangement. 56 indicates an electrical source of energy, 57 a heat control switch for connecting the units in two parallel groups if desired. The heater conductors 34 are connected to suitable switch posts and the line conductor 56 to the terminals of the same switch.

Instead of the heater structure of Figs. 1 to 4, a structure similar to that shown in Figs. 5 and 6 may be employed. This comprises a porous slab 38 which may be formed by mixing the fireclay with sawdust and baking to destroy the sawdust and leave small openings. Set in this slab are resistance elements or ribbons 39 which may be of any suitable form. For example, each ribbon may have slots 40 cut alternately from alternate edges, providing a zig-zag path for the electric current as shown in Fig. 6.

The steam instead of being discharged into a chamber such as the chamber 25 or 26 of Fig. 1, may be delivered to a perforated pipe or tube 42 disposed in a porous body 43, as shown in Fig. 7, and then be forced to percolate through the body and be heated to a higher temperature in passing therethrough by electric heater elements indicated at 44.

The heater elements increase the temperature of the body which has already been heated to a predetermined minimum by the steam pipe or tube 42 and the heat of the body reacts upon the steam and increases its temperature before it flows into the steam or vapor jacket 45. This jacket completely surrounds the oven and has outlets 46 from which the steam escapes into the condensation heater tubes 47. These correspond in position and function to the tubes 30 of the previous figures. Another set of tubes corresponding to tubes 29 may of course be interposed if desired.

Various modifications may be effected within the spirit and scope of my invention, and I intend that only such limitations be imposed as are indicated in the appended claims.

What I claim is:

1. A heat chamber comprising walls of heat insulation, a partition wall dividing off a narrow vapor compartment and means in the partition for permitting the passage of vapor therethrough into the heat chamber and for increasing the temperature of the vapor as it passes therethrough.

2. A heat chamber comprising walls of heat insulation, condensation heat pipes therein, a partition wall dividing off a narrow vapor compartment and an electrical heating member in the partition having a passage for vapor from the compartment to the heat chamber and adapted to increase the temperature of the vapor as it passes therethrough.

3. An oven comprising insulated walls, vapor transmitting means for dividing off a vapor compartment within the oven and electric heaters associated with said means for increasing the temperature of the vapor within the oven.

4. An oven having inclosing walls, means for preventing loss of heat therefrom, a body of relatively large heat capacity dividing off a vapor compartment within the oven and means in such body for increasing the temperature of the vapor within the oven.

5. An oven having inclosing walls, means for preventing loss of heat therefrom, a body of relatively large heat capacity dividing off a vapor compartment within the oven and electric heaters embedded in the body for increasing the temperature of the vapor within the oven.

6. An oven having inclosing walls, means for preventing loss of heat therefrom, a body of relatively large heat capacity dividing off a vapor compartment, and electric heaters embedded in such body and each comprising a tubular passage through which the vapor flows from the compartment to the oven.

7. An oven having inclosing walls, means for preventing loss of heat therefrom, a body of relatively large heat capacity dividing off a vapor compartment, and electric heaters in the form of tapering tubes embedded in said body and providing a plurality of vapor passages from the compartment to the oven, said tubes being arranged with their larger ends opening into the oven and being adapted to increase the temperature of the vapor as it flows from the compartment into the oven.

8. An oven comprising walls of heat insulating material, means in the insulation for providing a vapor passage, a discharge opening from the oven to such passage, means for admitting vapor to the oven and for increasing the temperature of the vapor as it is admitted.

9. An oven comprising walls of heat insulating material, means in the insulation for providing a vapor passage, a discharge opening from the oven to such passage, a partition dividing off a vapor compartment within the oven, means for supplying heated vapor to the compartment and means in the partition for permitting the vapor to flow from the compartment into the oven, and for increasing the temperature of the vapor as it flows through the partition.

10. An oven comprising walls of heat insulating material, means in the insulation for providing a vapor passage, a discharge opening from the oven to such passage, a body of relatively large heat capacity dividing off a relatively small vapor compartment within the oven, and tubular electric heater members embedded in said body and providing vapor passages from the compartment into the oven, whereby the vapor is increased in temperature as it flows through the tubes.

11. A heat chamber having inclosing walls, means for preventing loss of heat therefrom, a partition dividing the chamber into vapor inlet and outlet compartments, a body of relatively large heat capacity in the partition having means for permitting the slow passage of the vapor through it, and means in the body for increasing the temperature of the vapor as it passes therethrough.

12. A heat chamber comprising a working compartment, a heat storage mass associated with the compartment, heaters in the mass, and means for causing a heating medium to enter the working compartment through the mass.

13. A heat chamber comprising a working compartment, a heat storage mass forming one of the walls of the compartment, heaters in the mass, and means for causing a heating medium to enter the working compartment through the mass.

14. A heat chamber comprising walls of heat insulating material, a heat storage mass disposed close to one of the walls of the chamber, electric heaters in the mass, and means for causing hot vapor to enter the chamber through the mass.

In witness whereof I have hereunto set my hand this 29th day of February, 1916.

WILLIAM S. HADAWAY, Jr.